United States Patent [19]

Kobayashi et al.

[11] Patent Number: 5,438,341
[45] Date of Patent: Aug. 1, 1995

[54] MONITOR INTERFACE ARCHITECTURE FOR BLACK LEVEL TRANSFER

[75] Inventors: Masaki Kobayashi, Yamazaki; Rieko Kataoka; Masahiro Naitoh, both of Kanagawa, all of Japan

[73] Assignee: International Business Machines Corporation, Armonk, N.Y.

[21] Appl. No.: 281,900

[22] Filed: Jul. 28, 1994

[30] Foreign Application Priority Data

Jul. 30, 1993 [JP] Japan .................................. 5-189682

[51] Int. Cl.$^6$ ............................ G09G 1/14; G09G 5/10
[52] U.S. Cl. .......................................... 345/20; 345/22; 345/147; 345/153; 348/687
[58] Field of Search .................... 345/20, 22, 150, 153, 345/154, 147, 211–213; 348/633–636, 687–689

[56] References Cited

U.S. PATENT DOCUMENTS 4,382,254  5/1983  Ranalli ................................. 345/147

Primary Examiner—Jeffery Brier
Attorney, Agent, or Firm—Martin J. McKinley; Craig J. Yudell; Andrew J. Dillon

[57] ABSTRACT

A computer display device with digital RGB color signal lines, and horizontal and vertical synchronous signal lines. The controller comprising a means for taking out, from one of the digital RGB color signal lines which consists of an N bit digital signal, a black level signal defined as "0" or "1" in all N bits, and a means for adding the black level signal being taken out to either one of said horizontal and vertical synchronous signal lines. In addition to the controller, the present invention provides a display device including a means, provided within the display device, for extracting said black level signal from the synchronous signal with the black level signal being added, and a means for maintaining a black level potential of the display device at a predetermined value in response to the black level signal being extracted.

6 Claims, 4 Drawing Sheets

Black signal conversion by D/A converter

| Digital input (weight) | | | Analog output value | CRT display color |
|---|---|---|---|---|
| R (0.4) | G (0.2) | B (0.1) | | |
| 1 | 1 | 1 | 0.7V | Black |
| 1 | 1 | 0 | 0.6V | Blue |
| 1 | 0 | 1 | 0.5V | Green |
| 1 | 0 | 0 | 0.4V | Cyan |
| 0 | 1 | 1 | 0.3V | Red |
| 0 | 1 | 0 | 0.2V | Magenta |
| 0 | 0 | 1 | 0.1V | Yellow |
| 0 | 0 | 0 | 0V | White |

*Fig. 8*

MONITOR INTERFACE ARCHITECTURE FOR BLACK LEVEL TRANSFER

BACKGROUND OF THE INVENTION

1. Technical Field

The present invention relates to display devices and their controllers, and more particularly, to black display in display devices for computers, such as CRT display devices and liquid crystal display devices.

2. Description of the Related Art

Color display on the computer display device relies theoretically on an additive mixture process of three primary colors red, blue and green (referred to as RGB). More specifically, changing the luminescence intensity of each of three color elements of RGB for the area where a predetermined color of the display device is desired, ensures that it is seen as the predetermined color by the eye. By adjusting the luminescence intensity of each of three color elements of RGB, in principle, all colors within a triangle formed by connecting three points of the RGB primary colors in the chromaticity diagram can be displayed. Therefore, displaying a black image on the display device, for example, can basically be accomplished by adjusting the luminescence intensity of each of three RGB picture elements. Displaying black images, however, can be done simply by not illuminating the display screen. Thus black images have been displayed by preventing illuminance of all three color elements of RGB for the area of the display screen where the images are desired to be displayed.

The display device for computers, such as personal computers, has increased in color information to be handled, ranging from single colors for character display, up to eight colors for business graphics, up to 256 colors for simplified natural color display, to over several thousands colors for multimedia. Along with this trend, the interface between the display device and the display device controller in a computer has changed its display method from that of digital to analog RGB, which is able to display finer colors.

The interface between the computer display device and its controller is configured as shown in FIG. 1, for example, by connecting display device controller 2, wherein video data to be displayed is input, provided within personal computer 1, and display device 3 such as a CRT display device and liquid crystal display by means of five signal lines: three RGB signal lines, vertical (V) and horizontal (H) synchronous signal lines.

Generally, for analog RGB process, three RGB analog signals having an amplitude of 0 V to 0.7 V are transferred from the controller to the display device via color signal lines. For each one of RGB analog signals, 0 V corresponds to black and 0.7 V corresponds to white, and the color intensity of each primary RGB color is adjusted in a range from 0 V to 0.7 V. For the CRT display device, for example, each analog RGB signal being transmitted is amplified to a signal having a predetermined voltage ranging from a black level potential to a white level potential and applied to the CRT cathode, thus each picture element of RGB for the portion, wherein a predetermined color is desired to be displayed, of the CRT being illuminated at a predetermined intensity.

The display device has generally a manual control for adjusting brightness, allowing the user to change the brightness of the display screen. Referring to FIG. 2, to make the screen of the CRT display brighter, for example by moving the manual control, the entire color signal being amplified within the display device is shifted from the black level potential to white level potential and the voltage applied to the CRT cathode is increased, thus the whole screen is made brighter. In this case, however, a portion of signal which should be at the black level potential for displaying a black image on the screen also shifts toward the white level potential. Consequently, the entire display screen becomes "whitish"-looking. Three RGB picture elements for the portion of the screen where black is desired to be displayed are illuminated, and thus, even the portion which is desired to remain black also becomes whitish.

In addition, for the multimedia display device, for example, clearer color pictures are desired, and particularly black plays a very important role in more clearly displaying chromatic colors on the screen. Therefore, it is necessary for displaying clearer color images to have black manifest itself, i.e. to ensure that black images are displayed in an area where they must be displayed on the display device.

In such a situation, conventional computer display devices have given little or no special consideration to black image display. No prior art discloses a novel means for taking out a signal which should display a black image and using it to force the display device to display the black image.

SUMMARY OF THE INVENTION

With such situations considered, it is an object of the present invention to provide a means for displaying black images with certainty at locations where they should be displayed, and capable of displaying clearer color images in the computer display device.

The present invention provides a display device controller which is connected to a computer display device with digital RGB color signal lines, and horizontal and vertical synchronous signal lines. The controller comprising a means for taking out, from one of the digital RGB color signal lines which consists of an N bit digital signal, a black level signal defined as "0" or "1" in all N bits, and a means for adding the black level signal being taken out to either one of said horizontal and vertical synchronous signal lines.

In addition to the controller, the present invention provides a display device including a means, provided within the display device, for extracting said black level signal from the synchronous signal with the black level signal being added, and a means for maintaining a black level potential of the display device at a predetermined value in response to the black level signal being extracted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a conversion table for a three bit D/A converter as used in a preferred embodiment of the present invention.

DETAILED DESCRIPTION OF THE PREFERRED EMBODIMENT

With reference to FIGS. 3 to 7, details of the present invention will be described. Although the following description is for a CRT display device, the principle of the present invention is also applicable to other display devices such as liquid crystal display devices.

Figure 4:
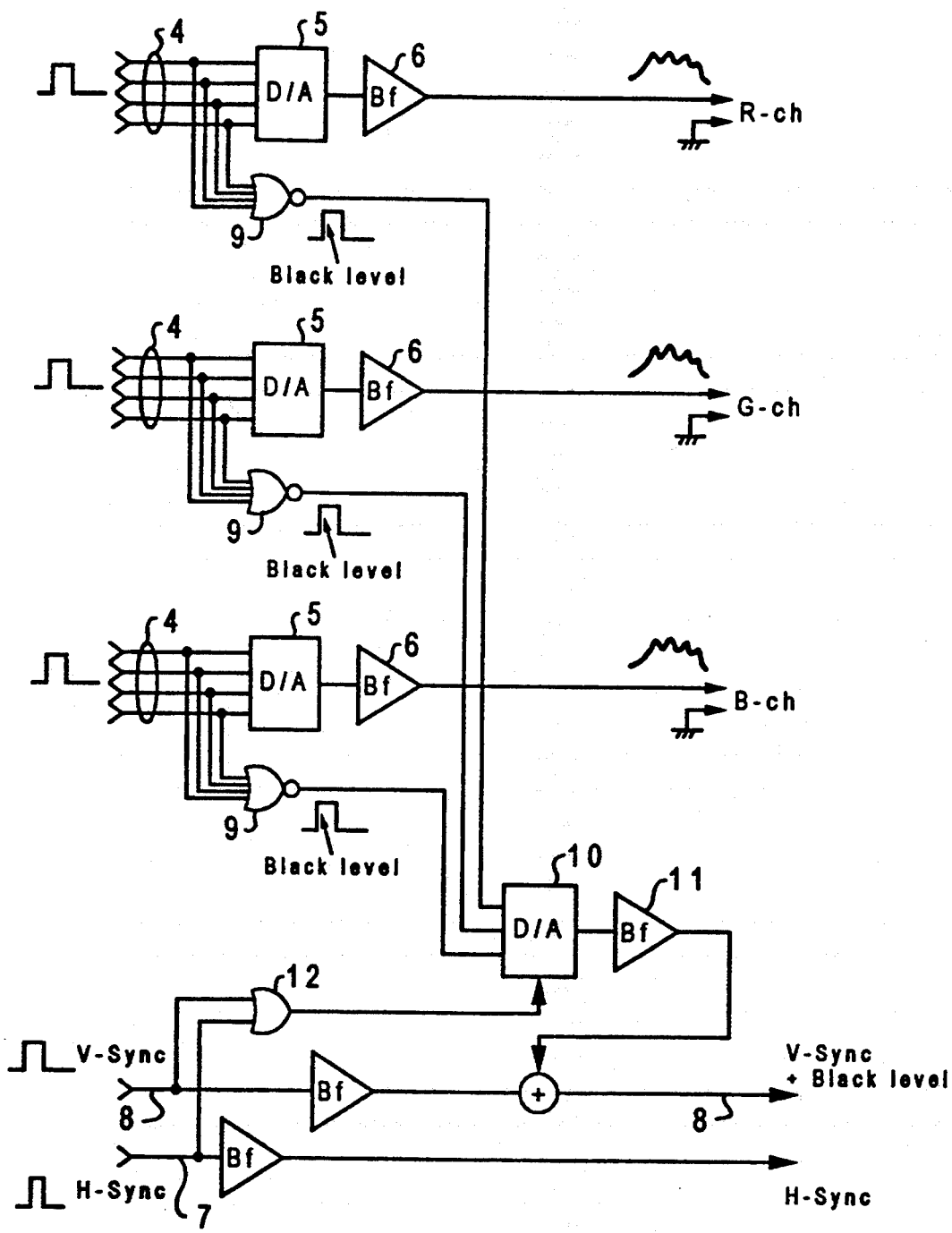
FIG. 4 shows one embodiment of the CRT display device controller according to the present invention.

FIG. 4 shows one embodiment of the display device controller according to the present invention. In FIG. 4, there are shown output stages of RBG color signals and horizontal and vertical synchronous signal output stages within the controller for the case where RGB primary colors are transmitted as four bit digital signals from the computer CPU. In the figure, the output stage of RGB color signals are shown in detail only for the R channel, and details of GB are omitted. Basically the following description is based on the R channel, though, the same applies to GB.

In FIG. 4, four bit analog color signals sent from the computer CPU via four bit digital color signal lines 4 are converted by four bit digital/analog converter 5 into a single analog signal having a voltage of 0 V to 0.7 V and output from the controller via buffer 6. The output analog color signal is sent to the CRT display device via an interface cable (not shown). On the other hand, horizontal and vertical synchronous digital signals are output through horizontal synchronous signal line 7 and vertical synchronous signal line 8 and, similarly to RGB signals, sent to the CRT display device via the interface cable. The descriptions hereinabove remains the same as for the configuration of conventional controllers for the CRT display device.

A configuration which relates to the present invention will now be described. Each of four bit digital color signal lines 4 is branched before being input to D/A converter 5 and input to NOR gate 9. The output line of NOR gate 9 is coupled to D/A converter 10 for conversion into an analog signal. The output line of D/A converter 10 is coupled to vertical synchronous signal line 8 via buffer 11. In an alternative embodiment, the output line of D/A converter 10 may be coupled to horizontal synchronous signal line 7 instead of the vertical synchronous signal line 8. Moreover, two signal lines branched from horizontal synchronous signal line 7 and vertical synchronous signal line 8 are coupled to OR gate 12, the output line of which being coupled to D/A converter 10.

Now operations of the present invention will be described. For black image display by the CRT display device, a digital color signal of a predetermined bit pattern corresponding to black display is sent to the controller. This predetermined bit pattern is so specified that all bits of four bit digital color signals 4, for example, are "0" s or "1" s. The present invention extracts an output defined as a "black level signal" which corresponds to that predetermined bit pattern for black image display. That is, in an embodiment of the present invention, when all four bits are "0" s, NOR gate 9 outputs "1" defined as the "black level signal". If "1" is sent for all of four bit digital color signals 4 as black level signals, using an AND gate instead of NOR gate 9 produces a similar "black level signal". The G and B channels have a similar function to this. When a black level signal "1" is output from all three NOR gates 9, the output signals are input to D/A converter 10 as a three bit digital signal.

Three bit D/A converter 10 converts three RGB digital black level signals into a single analog signal based upon, for example, the conversion table shown in FIG. 8. In this case, the black level signal from each RGB channel is given a predetermined weight before being converted into an analog signal. Specifically, in FIG. 8, black level signals from RGB channels are weighted 0.4, 0.2, and 0.1 respectively. This weight giving is made to determine which one of the RGB channels is providing the black level signal when the CRT display device, described below, decouples the black level signal of the RGB channels which is sent through vertical synchronous signal line 8 to which the black level signal has been added.

The analog signal to be output from D/A converter 10 is set at a signal level which is lower than the discrimination threshold of the vertical synchronous signal at the CRT display device for discrimination with the vertical synchronous signal. For example, in FIG. 8, conversion is made so that the level is less than 0.7 V which is a "0" level threshold for the TTL used for detecting vertical synchronous signals at the display device. This prevents the black level signal which is added to the vertical synchronous signal from being inadvertently detected as a vertical synchronous signal, i.e. signal "1", by the vertical synchronous signal detector at the display device. Thus, to display an image with all colors in black, that is a black image, the three RGB digital signals of "1" s are output as an analog signal of 1*0.4+1*0.2+1*0.1=0.7 V after weighing.

Figure 5:
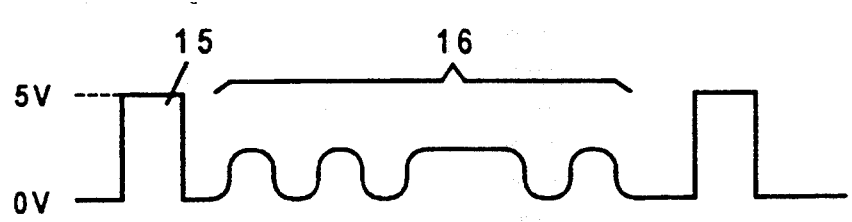
FIG. 5 is a schematic diagram of a vertical synchronous signal to which the black level signal is added according to the present invention.

The black level signal being converted into an analog signal having a predetermined amplitude is input to vertical synchronous signal line 8 via buffer 11. FIG. 5 shows black level signal 16 in an exaggerated manner to help understand how black level signal 16 is added to the synchronous signal.

Thus, by having the amplitude of the black level signal added to the vertical synchronous signal below the vertical synchronous detection threshold, even when the controller including the configuration of the present invention is connected to a conventional CRT display device, and in the CRT display device even when black level signals from RGB channels are added to the vertical synchronous signal, they are not detected as vertical synchronous signals and only vertical synchronous signals can be detected as vertical synchronous signal. Therefore, the controller of the present invention may be connected to conventional display devices for use, thus compatibility with prior art display devices is realized.

The output of OR gate 12 which has been input to D/A converter 10 turns "1" (High) when either one or both of horizontal and vertical synchronous signals which are inputs to the OR gate are "1" (High), and is used to force the output of D/A converter 10 into "0". This is because the CRT will display "black" during horizontal or vertical synchronization, and "black" can be discriminated based upon a horizontal or vertical synchronous signal pulse at the display device, thus eliminating the need for intentionally adding the black display signal to the vertical synchronous signal lines. During vertical synchronization, if for example a black level signal of 0.7 V is added, the synchronous signal detector inadvertently recognizes that the ground level of the vertical synchronous signal has risen to 0.7 V. This could cause a trouble that the vertical synchronous signal would not be precisely recognized. To prevent this, the output of D/A converter 10 is forced into "0" during synchronization.

Figure 6:
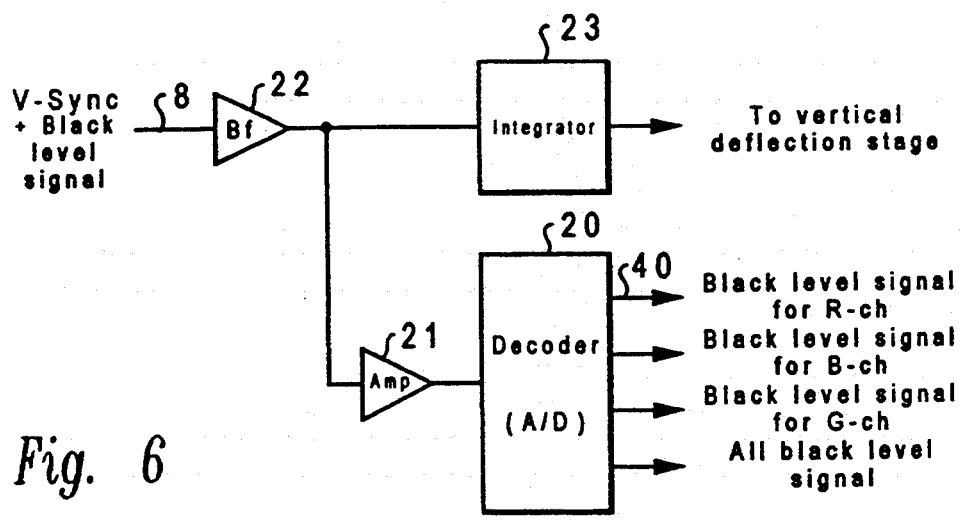
FIG. 6 is one embodiment of a means for extracting the black level signal from the vertical synchronous signal to which the black level signal is added, for the CRT display device according to the present invention.

Now one embodiment of the CRT display device according to the present invention will be described. FIG. 6 shows a configuration for receiving the vertical synchronous signal to which the black level signal of RGB channels is added at the CRT display device. Vertical synchronous signal line 8 with added black level signal is coupled to integrator 23 via buffer 22, and branched before being input to integrator 23 and coupled to decoder 20 via amplifier 21.

Integrator 23 decouples only the vertical synchronous signal from the vertical synchronous signal to which the black level signal has been added, and sends it to the vertical deflection stage of the CRT. On the other hand, from the vertical synchronous signal, to which the black level signal being amplified to a predetermined magnitude by amplifier 21 is added, only the black level signal is decoupled by decoder 20 to be output. The signal being decoupled and output includes not only "all black level signal" as all RGB channels display a black image, but also three black level signals for respective RGB channels which are determined based on FIG. 8 mentioned above. Thus, if for example the magnitude of the black level signal added to the vertical synchronous signal is 0.3 V, the decoder 20, based on FIG. 8, outputs a black level signal of "1" for two (GB) channels and a black level signal of "0" for the R channel 40. Decoder 20 can decouple the black level signal for each channel of RGB for output.

Figure 1:
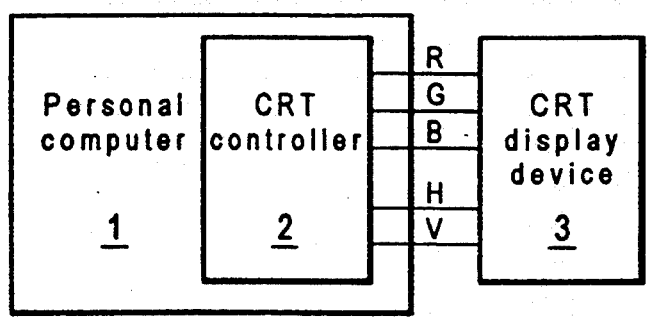
FIG. 1 shows an interface between a conventional controller for personal computers and CRT display device.
Figure 2:
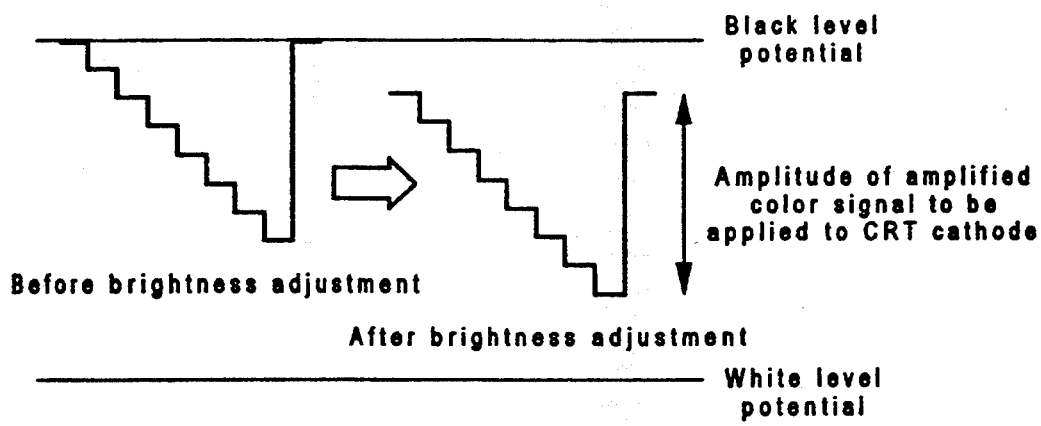
FIG. 2 shows the variation of the black level potential before and after brightness adjustment for amplified color signals within a conventional CRT display device.
Figure 3:
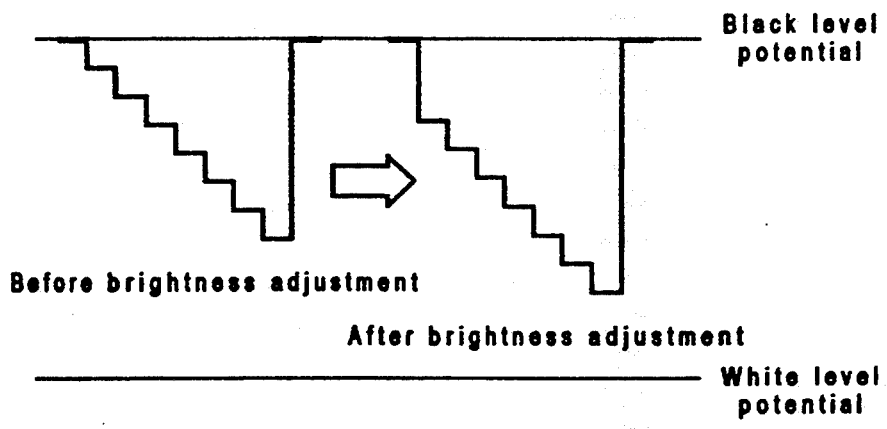
FIG. 3 shows that the black level potential for color signals amplified within the CRT display device according to the present invention remains unchanged before and after brightness adjustment.
Figure 7:
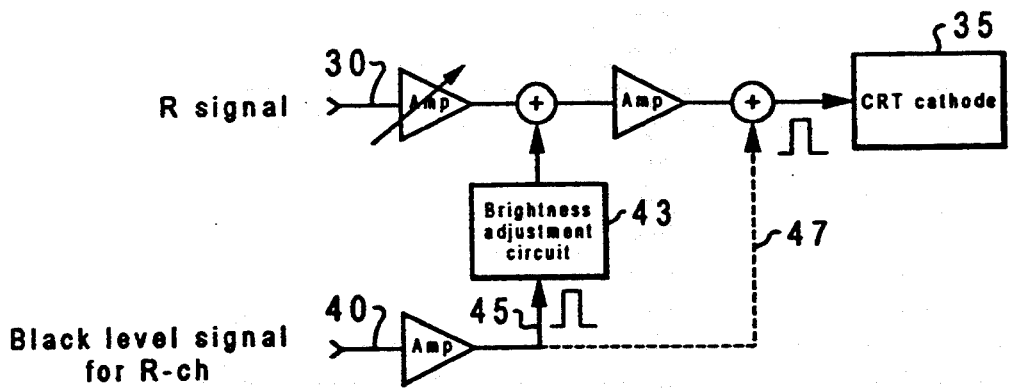
FIG. 7 is an alternate embodiment using the black level signal extracted from the vertical synchronous signal at the CRT display device according to the present invention.

The use of the black level signal being output from the decoder will now be described with reference to FIG. 7. The R channel black level signal 40 being output from the decoder is input to brightness control circuit 43 after being amplified to a given degree. The signal 45 is used, even when the manual control for brightness adjustment is turned, to maintain a black level potential of the color signal being amplified and applied to the CRT cathode 35. That is, even if brightness is controlled by amplifying R signal 30, as shown in FIG. 3, the black level signal 45 amplified to a given degree signals to brightness control circuit 43 when a black image is to be displayed. When this signal is received, brightness adjustment circuit 43 controls the potential of the portion of the signal which should display a black image so that it can be kept at the black level potential. In addition, similar effect can be achieved by adding the black level signal 47 (shown in dashed line) being amplified to a given degree directly to the R signal line which is applied to the CRT cathode. The same description applies to the use of the G and B black level signals.

Thus, since the decoder outputs the black level signal of "1" for each RGB channel, the potential of the portion of the signal which should display a black image of the amplified color signal can be kept at the black level potential, even when the control is turned for brightness adjustment mentioned above, as shown in FIG. 3, thus preventing whitish pictures on the whole screen. Therefore, the portion desired to be black itself can be maintained in black.

The embodiment described above is so configured that the black level signal, of each channel of RGB which has been weighted at a given value by using three bit D/A converter 10, is added to the vertical synchronous signal line. However, a more simplified method may be employed that uses a three input AND gate in place of three bit D/A converter in order to add only an "all black level signal" or all channels of RGB being "black" to vertical synchronous signal line 8.

According to the present invention, in the computer display, the display device controller provides a new "black level signal" to the display device. Using this black level signal allows for displaying clearer color images. In brightness adjustment, for instance, it is possible to prevent the picture element, which must display a black image, among RGB color pixels on the display screen from being illuminated, no matter how the adjustment control is manipulated. This prevents the whole screen from becoming whitish, and ensures that the portion which is desired to remain in black is maintained in black itself, thus allowing chromatic colors such as red and blue to be displayed more clearly.

While the invention has been particularly shown and described with reference to a preferred embodiment, it will be understood by those skilled in the art that various changes in form and detail may be made therein without departing from the spirit and scope of the invention.

We claim:

1. A display device controller connected to a display device with RGB color signal lines, horizontal and vertical synchronous signal lines, comprising:
   a means for taking out a black level signal from at least one of said RGB color signal lines, each said color signal consisting of an N bit digital signal, said black level signal being defined as a predetermined N bit pattern; and
   a means for adding said black level signal being taken out to at least one of said horizontal and vertical synchronous signal lines.

2. The controller according to claim 1, wherein said means for taking out said black level signal is provided at each said RGB color signal lines.

3. The controller according to claim 2, wherein said adding means sets a predetermined weight upon each said black level signal being taken out from each said RGB color signal before adding each to said synchronous signal lines.

4. The controller according to claim 3, wherein the magnitude of said black level signal having the predetermined weight is smaller than a differential threshold value of said synchronous signal.

5. A display device and its controller interconnected with RGB color signal lines, horizontal and vertical synchronous signal lines, comprising:
- a means for taking out a black level signal from at least one of RGB color signals, each of which consisting of an N bit digital signal, said black level signal being defined as a predetermined N bit pattern, and adding said black level signal being taken out to at least one of said horizontal and vertical synchronous signal lines;
- a means for extracting said black level signal from said horizontal or vertical synchronous signal to which said black level signal is being added; and
- a means for maintaining the black level potential of the display device at a predetermined value in response to said black level signal being extracted.

6. The display device and its controller according to claim 5, wherein said means for extracting said black level signal is capable of extracting and outputting the black level signal being taken out from each of said RGB color signal lines as a black level signal corresponding to each of said RGB color signal lines.

* * * * *